US010957062B2

(12) United States Patent
Gros

(10) Patent No.: US 10,957,062 B2
(45) Date of Patent: Mar. 23, 2021

(54) STRUCTURE DEPTH-AWARE WEIGHTING IN BUNDLE ADJUSTMENT

(71) Applicant: Bentley Systems, Incorporated, Exton, PA (US)

(72) Inventor: Nicolas Gros, Valbonne (FR)

(73) Assignee: Bentley Systems, Incorporated, Exton, PA (US)

(*) Notice: Subject to any disclaimer, the term of this patent is extended or adjusted under 35 U.S.C. 154(b) by 339 days.

(21) Appl. No.: 16/239,142

(22) Filed: Jan. 3, 2019

(65) Prior Publication Data
US 2020/0134847 A1  Apr. 30, 2020

(30) Foreign Application Priority Data

Oct. 31, 2018  (EP) ..................... 18306437

(51) Int. Cl.
*G06K 9/00* (2006.01)
*G06T 7/579* (2017.01)
*G06T 7/246* (2017.01)

(52) U.S. Cl.
CPC .......... *G06T 7/579* (2017.01); *G06K 9/00664* (2013.01); *G06T 7/246* (2017.01); *G06T 2207/10004* (2013.01); *G06T 2207/30244* (2013.01)

(58) Field of Classification Search
None
See application file for complete search history.

(56) References Cited

U.S. PATENT DOCUMENTS

| 8,693,734 | B2 | 4/2014 | Jin |
| 8,942,422 | B2 | 1/2015 | Jin |
| 9,177,384 | B2 | 11/2015 | Weisenburger |
| 9,852,238 | B2 | 12/2017 | Forsyth et al. |
| 2014/0139635 | A1 | 5/2014 | Chandraker et al. |

(Continued)

OTHER PUBLICATIONS

Crandall, David J., et al. "SfM with MRFs: Discrete-continuous optimization for large-scale structure from motion." IEEE transactions on pattern analysis and machine intelligence 35.12 (2012): 2841-2853. (Year: 2012).*

(Continued)

*Primary Examiner* — Sean M Conner
(74) *Attorney, Agent, or Firm* — Cesari and McKenna, LLP; James A. Blanchette

(57) ABSTRACT

In various embodiments, techniques are provided for photogrammetric 3D model reconstruction that modify the optimization performed in bundle adjustment operations of an automatic SfM stage to apply a depth-aware weighting to reprojection error of each 3D point used in the optimization. The reprojection error of each 3D point may be weighted based on a function of distance, density of a cluster, or a combination of distance and density. A loss function may be scaled to account for the weighting, and normalizations applied. Such weighting may force consideration of 3D points on an object of interest in the foreground and improve convergence of the optimization to global optima. In such manner, accurate and complete 3D models may be reconstructed of even ill-textured or very thin objects in the foreground of a scene with a highly textured background, while not consuming excessive processing and storage resources or requiring tedious workflows.

20 Claims, 11 Drawing Sheets

(56) References Cited

U.S. PATENT DOCUMENTS

2015/0237330 A1    8/2015  Jang
2020/0334842 A1*  10/2020  Michielin ............... G06T 15/10

OTHER PUBLICATIONS

Triggs, Bill, et al. "Bundle adjustment—a modern synthesis." International workshop on vision algorithms. Springer, Berlin, Heidelberg, 1999. (Year: 1999).*

Buczko, Martin, and Volker Willert. "How to distinguish inliers from outliers in visual odometry for high-speed automotive applications." 2016 IEEE Intelligent Vehicles Symposium (IV). IEEE, 2016. (Year: 2016).*

Hellman, Tapio, et al., "Photogrammetric 3D Modeling for Virtual Reality," Technical Report, Aug. 2018, pp. 160-175.

Mlambo, Reason, et al., "Structure from Motion (SfM) Photogrammetry with Drone Data: A Low Cost Method from Monitoring Greenhouse Gas Emissions from Forests in Developing Countries," MDPI, Forests,vol. 8, No. 68, Mar. 3, 2017, p. 1-20.

"Reality Modeling: ContextCapture: Software to Automatically Generate Detailed 3D Models from Photographs," Quick Start Guide, Context Capture CONNECT Edition, Bentley Systems, Incorporated, Mar. 15, 2017, pp. 1-34.

Triggs, Bill, et al., "Bundle Adjustment—A Modern Synthesis," Springer-Verlag Berlin Heidelberg, Vision Algorithms: Theory and Practice, IWVA '99, Lecture Notes in Computer Science, vol. 1883, Aug. 25, 2000, pp. 298-372.

Westoby, M. J., et al., "'Structure-from-Motion' Photogrammetry: A low-cost, effective tool for geoscience applications," Geomorphology, vol. 179, Elsevier B. V., Aug. 2012, pp. 300-314.

* cited by examiner

US 10,957,062 B2

STRUCTURE DEPTH-AWARE WEIGHTING IN BUNDLE ADJUSTMENT

RELATED APPLICATION

The present application claims priority to EP Application No. 18306437.7 by Nicolas Gros, titled "Structure Depth-Aware Weighting in Bundle Adjustment", filed on Oct. 31, 2018 with the French Receiving Office, the contents of which are incorporated by reference herein in their entirety.

BACKGROUND

Technical Field

The present disclosure relates to photogrammetric three dimensional (3D) model reconstruction, and more specifically to techniques for improved photogrammetric 3D model reconstruction for ill-textured or very thin objects in the foreground.

Background Information

It is often desirable to create a 3D model of existing infrastructure (e.g., buildings, roads, bridges, telecommunications towers, electrical power networks, etc.). While such 3D models may be created manually utilizing a computer aided design (CAD) application, such process can be quite time consuming. Accordingly, there is increasing interest in automatic model generation software, including photogrammetric 3D model reconstruction software.

Photogrammetric 3D model reconstruction software may receive a set of images (e.g., two-dimensional (2D) photographs) of a scene taken from different viewpoints, analyze those images, and automatically compute the relative poses of the images in 3D space and 3D geometry of the scene. This process may involve automatically detecting and matching points across images that correspond to the same feature in the scene, and using this information to determine 3D points and camera parameters. The overall operation is often divided into two distinct stages: an automatic structure-from-motion (SfM) stage and a dense 3D reconstruction stage. The automatic SfM stage typically involves SfM techniques that compute camera parameters of each of the images and generate a low-density (i.e. sparse) 3D point cloud. FIG. 1 is diagram 100 illustrating example results of an automatic SfM stage for a scene including a telecommunications tower, with icons representing camera poses 110 and 3D points 120 of a sparse 3D point cloud.

The 3D reconstruction stage typically involves a dense 3D reconstruction that produces a 3D model from the sparse 3D point cloud and camera parameters. The stage may apply multi-view stereo (MVS) reconstruction techniques to produce a high resolution dataset and utilize photogrammetry algorithms to produce the final 3D model. FIG. 2 is view 200 including an example 3D model that may be produced by a 3D reconstruction stage for the scene of FIG. 1. Icons representing camera poses 110 for images used in the 3D reconstruction are also shown.

While existing photogrammetric 3D model reconstruction software may create accurate, complete 3D models in some use cases, it may struggle in other use cases involving ill-textured or very thin objects in the foreground of a scene and highly textured backgrounds. For example, consider the case of a scene including a piece of infrastructure, such as a telecommunications tower, in the foreground, similar to as shown in FIG. 1 and FIG. 2. Images of the telecommunications tower may be captured from viewpoints that circle the tower, for example, using a camera of an aerial drone. The backgrounds of the images captured from such viewpoints may include highly-textured portions of the ground and landscape. While the masts, struts and antennas of the telecommunications tower in the foreground of the images may be ill-textured and very thin. In such a case, existing photogrammetric 3D model reconstruction software may produce a 3D model that is inaccurate and incomplete. FIG. 3 is a view 300 including an example inaccurate and incomplete 3D model of a telecommunications tower. As can be seen, portions of the struts and antennas are not modeled, decreasing the usefulness of the 3D model for many engineering, operations and maintenance tasks.

Much of the difficulty existing 3D model reconstruction software has with ill-textured or very thin objects in the foreground results from limitations of the automatic SfM stage. In general, SfM techniques employed in the stage do not well handle the presence of noisy or incomplete data with a density of signal not homogeneously spread over various depth planes. Various measures have been attempted to address this issue, but have proven ineffective or have introduced other undesirable problems. For example, some attempts have been made to fine-tune image capture and processing parameters. These measures have included increasing the amount of data processed by the 3D model reconstruction software (i.e. capturing more images, extracting and processing more keypoints, etc.), relaxing outlier detection thresholds, and reducing the parameter space via camera internal calibration, among others. However, such measures have not guarantee improved accuracy and completeness, have often added noise to the source data, and have often increased hardware resource demands (i.e. processing time, storage requirements, etc.). Since photogrammetric 3D model reconstruction is already a hardware resource intensive operation that can burden the processing and storage capabilities of electronic devices, further increasing hardware resource demands may be highly undesirable. Other attempts have been made that rely upon some form of manual user intervention. These measures have required users to manually identify correspondence of keypoints on the object of interest, pre-instrument the object of interest to enforce a high-density of points thereon (e.g., applying specific patterns to the object of interest), and various types of iterative and incremental workflows. Such measures have introduced burdens upon the user, making photogrammetric 3D model reconstruction a tedious process, and have proven impractical (or sometimes impossible). For example, pre-instrumenting a tall telecommunications tower may not be practical, or even possible.

Accordingly, there is a need for techniques for photogrammetric 3D model reconstruction that may produce accurate and complete 3D models of even ill-textured or very thin objects in the foreground, without introducing other undesirable problems (e.g., increased hardware resource demands, tedious workflows, etc.).

SUMMARY

In various embodiments described below, techniques are provided for photogrammetric 3D model reconstruction that modify the optimization performed in bundle adjustment operations of an automatic SfM stage to apply a depth-aware weighting to reprojection error of each 3D point used in the optimization. The reprojection error of each 3D point may be weighted based on a function of its distance, density of a cluster to which it belongs, or a combination of distance and density. A loss function of the optimization may be scaled to account for the weighting, and normalizations applied. Such weighting may force consideration of 3D points on an object of interest in the foreground, enabling reconstruction of a more accurate and complete 3D model without increased hardware resource demands, tedious workflows, or other undesirable side-effects.

In one specific embodiment, 3D model reconstruction software executing on an electronic device performs a photogrammetric 3D model reconstruction by first obtaining a set images of a scene that include an object of interest (e.g., a piece of infrastructure, such as a telecommunications tower, in the foreground) taken by a camera (e.g., of the electronic device or of a separate device, such as an aerial drone) from different viewpoints. The 3D model reconstruction software, or backend 3D model reconstruction processing software executing on a server or cloud services, implements an automatic SfM stage that automatically selects keypoints in the sets of images, automatically matches corresponding keypoints that appear in more than one of the set of images, estimates 3D points in 3D space for features of the scene represented by corresponding keypoints in the images and performs bundle adjustment operations to simultaneously refine the estimated 3D points and camera parameters for the set of images. The bundle adjustment operations involve an optimization with a loss function that penalizes reprojection error, wherein a depth-aware weighting is applied to the reprojection error of each 3D point in the optimization. The depth-aware weighting may be a weighting based on a function of distance between the respective 3D point and the camera, such as an inverse of distance between the respective 3D point and the camera; a weighting based on a function of density of a distance-related cluster of the respective 3D point, such as an inverse of a number of points of the cluster of the respective 3D point; or a weighting based on a function that combines distance between the respective 3D point and the camera and density of the cluster of the respective 3D point (with an additional normalization). Such weighting may operate to increase the number of 3D points retained in bundle adjustment operations on the object of interest (e.g., the piece of infrastructure, such as the telecommunications tower, in the foreground). The 3D model reconstruction software, or backend 3D model reconstruction processing software executing on the server or cloud services, then implements a dense 3D reconstruction stage that utilizes the refined estimated 3D positions and camera parameters from the bundle adjustment operations to produce a 3D model (e.g., a textured 3D mesh) that includes the object. Thereafter, the 3D model reconstruction software may output the 3D model, for example, display the 3D model on a display screen.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 4:
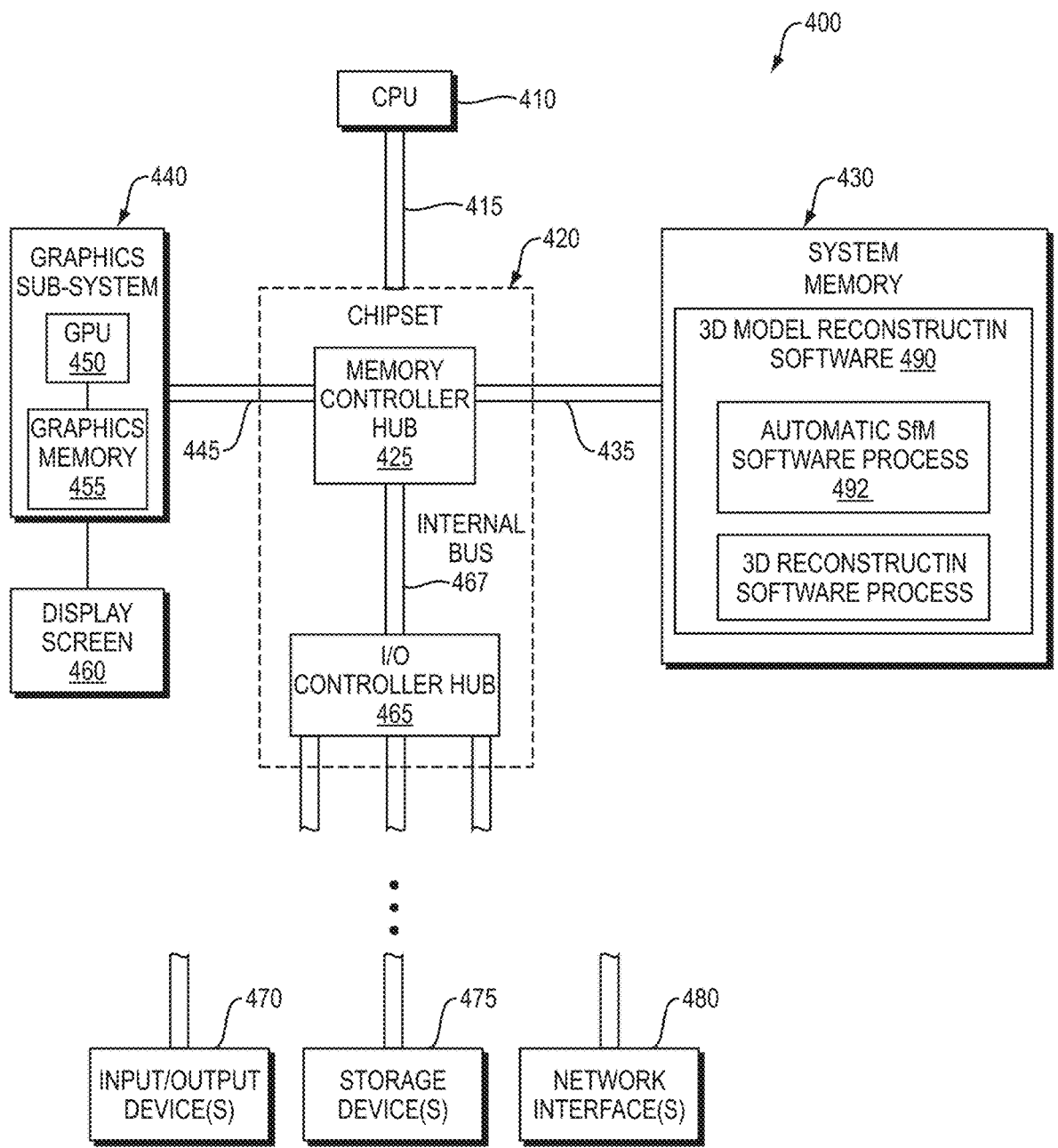
FIG. 4 is a block diagram of an example electronic device (e.g., a desktop computer, smartphone, tablet, etc.)

FIG. 4 is a block diagram of an example electronic device 400 (e.g., a desktop computer, smartphone, tablet, etc.). The electronic device includes a central processing unit (CPU) 410 that may be coupled to a chipset 420 by a front side bus 415. The chipset 420 includes a memory controller hub 425 that is responsible for communications with high-speed devices such as system memory 430 and a graphics subsystem (e.g., a graphics card) 440. The memory controller hub 425 is coupled to the system memory 430 by a high-speed memory bus 435. The system memory 430 is typically volatile memory, such as a Random Access Memory (RAM), which is adapted to store a wide range of software and data being actively used by the CPU 410. The memory controller hub 425 is coupled to a graphics subsystem 440 by a high-speed graphics bus 445. The graphics subsystem 440 includes a GPU 450 and graphics memory 455, among other components. The graphics subsystem 440 is coupled to at least one display screen 460.

The chipset 420 further includes an input/output controller hub 465 coupled to the memory controller hub by an internal bus 467. Among other functions, the input/output controller hub 465 may support a variety of types of peripheral buses, for connecting to other system components. The system components may include one or more I/O devices 470, such as a keyboard, a mouse, a touch sensor, a camera, etc., one or more persistent storage devices 475, such as a hard disk drive, a solid-state drive, or another type of persistent data store, one or more network interfaces 180, such as an Ethernet interface, a Wi-Fi interface, Bluetooth interface, etc., among other system components. The network interface(s) 480 may allow communication with other electronic devices over a computer network, such as the Internet, to enable various types distributed, or cloud computing arrangements.

Working together, the components of the electronic device 400 (and other electronic devices in distributed or cloud computing arrangements) may execute software operating upon data that are both persistently stored in storage devices, such as storage devices 475 and loaded into memory, such as memory 430, when needed. For example, 3D model reconstruction software 490 may be provided that utilizes a set of multiple images (e.g., 2D photographs) of a scene taken by a camera (either of the electronic device 400, or of another device, such as an aerial drone (not shown)) from different viewpoints to automatically reconstruct a 3D model (e.g., a textured 3D mesh) of the scene. The model reconstruction software 490 may take different forms, in which the processing necessary to create the 3D model is performed in different locations. In one implementation, the 3D model reconstruction software 490 may be a stand-alone application that performs the necessary processing using the CPU 410 of the electronic device, such as the ContextCapture™ desktop reality modeling application available from Bentley Systems, Inc. In such an implementation, an automatic SfM software process 492 and a 3D reconstruction software process 494 may be executed by the CPU 410 of the electronic device 400. In another implementation, the 3D model reconstruction software 490 may be a client application that provides user interface functionality but offloads necessary processing operations to servers or cloud computing services, such as the ContextCapture™ Console or the ContextCapture™ Mobile reality modeling application available from Bentley Systems, Inc. In such an implementation, the automatic SfM software process 492 and the 3D reconstruction software process 494 may not be part of the 3D model reconstruction software 490, but instead a portion of server-based or cloud services-based backend 3D model reconstruction processing software (not shown). In such manner, processor intensive operations may be offloaded from the electronic device 400 to servers or cloud computing services (not shown).

In operation, when the 3D model reconstruction software 490 is supplied with a set of multiple images that were taken from multiple viewpoints, the automatic SfM software process 492 utilizes SfM techniques to compute camera parameters of each of the multiple images and generates a low-density (i.e. sparse) 3D point cloud. Thereafter the, 3D reconstruction software process 494 performs a dense 3D reconstruction that produces a 3D model (e.g., a textured 3D mesh) from the sparse 3D point cloud and camera parameters, utilizing MVS reconstruction techniques photogrammetry algorithms.

Figure 5:
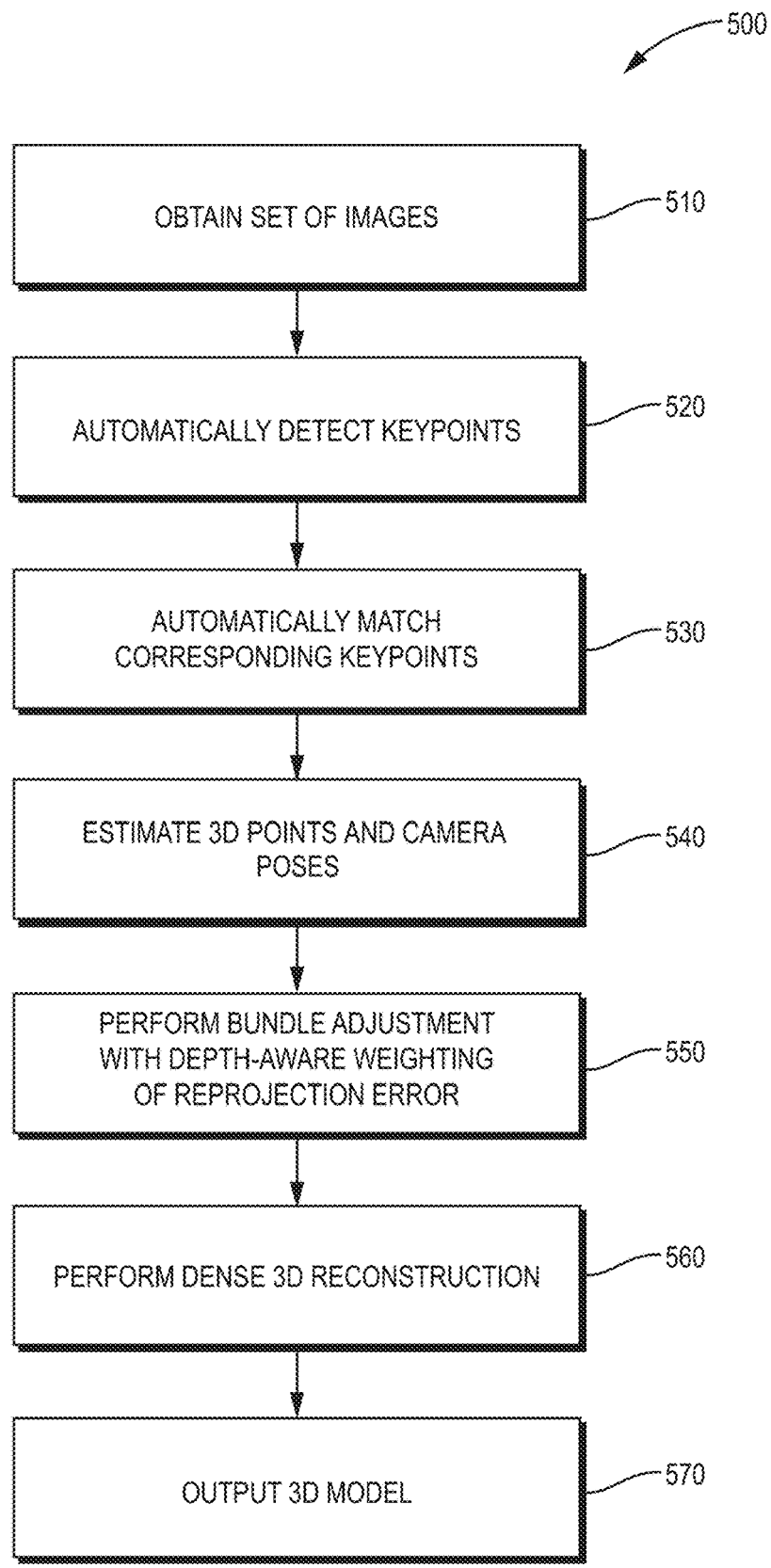
FIG. 5 is a flow diagram of an example sequence of steps that may be performed to produce a 3D model from a set of images.

FIG. 5 is a flow diagram of an example sequence of steps 500 that may be performed (e.g., by the 3D model reconstruction software 490 and automatic SfM and 3D reconstruction software process 492, 494) to produce a 3D model from a set of images (e.g., 2D photographs). At step 510, the 3D model reconstruction software 490 on the electronic device 400 obtains a set of images of a scene that include an object of interest (e.g., a piece of infrastructure, such as a telecommunications tower, in the foreground) captured by a camera from different viewpoints. The set of images may be obtained from a camera of the electronic device 400, transferred to the electronic device 400 from a separate device (such as an aerial drone), loaded from a library of stored images, or other otherwise obtained.

At step 520, the automatic SfM software process 492 (of the 3D model reconstruction software 490 on the electronic device 400 or of backend 3D model reconstruction processing software on a server or cloud services) automatically detects features of interest (i.e. keypoints) in the sets of images. Any of a number of known feature detection and matching algorithms may be employed, for example, a scale-invariant feature transform (SIFT) algorithm, a speeded up robust features (SURF) algorithm, a binary robust independent elementary features (BRIEF) algorithm, etc. The keypoints typically are 2D points within the images (e.g., 2D photographs). At least some of the keypoints typically will represent features on the object of interest (e.g., on the object in the foreground, such as a telecommunications tower) while other keypoints may represent features on other portions of the scene (e.g., on the background, such as the ground or sky).

At step 530, the automatic SfM software process 492 (of the 3D model reconstruction software 490 on the electronic device 400 or of backend 3D model reconstruction processing software on a server or cloud services) automatically matches corresponding keypoints that appear in more than one of the set of images. The feature detection and matching algorithm used in step 520 may also perform this operation.

At step 540, the automatic SfM software process 492 (of the 3D model reconstruction software 490 on the electronic device 400 or of backend 3D model reconstruction processing software on a server or cloud services) estimates 3D points in 3D space for features of the scene (e.g., the feature on the object of interest or background) represented by corresponding keypoints in the images and estimates camera poses.

At step 550, the automatic SfM software process 492 (of the 3D model reconstruction software 490 on the electronic device 400 or of backend 3D model reconstruction processing software on a server or cloud services) performs bundle adjustment operations to simultaneously refine the estimated 3D positions and camera parameters describing changes in camera pose between images and optical characteristics. Bundle adjustment operations may involve an optimization where the loss function of the optimization penalizes reprojection error. In this context, "reprojection error" refers to a discrepancy in the position of a 2D reprojection of a 3D point estimated from one or more keypoints in one or more images, and a keypoint used to estimate the 3D point. Reprojection error may be measured in terms of distance. The loss function of the optimization that penalizes reprojection error may be a nonlinear least squares loss function, or another type of loss function that is more robust to noisy data, for example, a soft L1 loss function, a Huber loss function, etc. Use of a more robust loss function, as well as outlier detection algorithms (e.g., random sample consensus (RANSAC)-based detection of outliers) and other techniques, may prevent a few highly inaccurate 3D points from pulling the optimization significantly towards an incorrect result.

Figure 6:
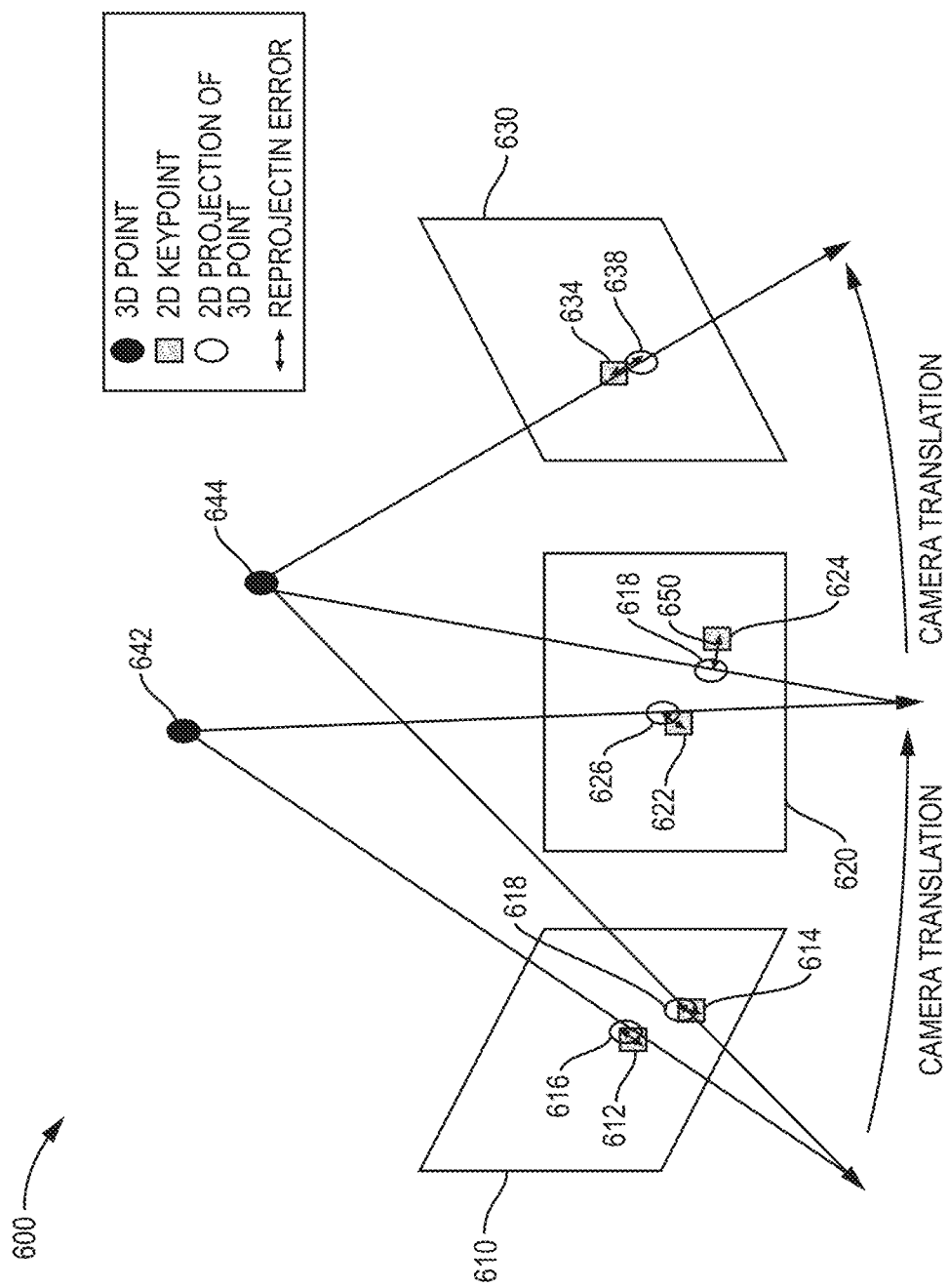
FIG. 6 is a diagram showing example bundle adjustment operations that may illustrate use of a loss function to penalize reprojection error.

FIG. 6 is a diagram 600 showing an example of bundle adjustment operations that may illustrate use of a loss function to penalize reprojection error. Three images 610-630 are provided arranged in 3D space according to the pose from which they were captured. The images 610-630 include detected keypoints 612, 622 from which a 3D point 642 is estimated in 3D space and keypoints 614, 624, 634 from which a 3D point 644 is estimated in 3D space. The 3D points 642, 644 may be projected back onto the images as 2D reprojections 616, 626, 618, 628, 638. Due to noise in the underlying data and other sources of inaccuracy (e.g., erroneous measurements, mismatched keypoints, etc.) the 2D reprojections typically will not exactly coincide with the keypoints, and have a reprojection error 650. It should be understood that all 2D reprojections 616, 626, 618, 628, 638 will typically have some amount of reprojection error.

The reprojection error may be stated mathematically as:

$$err_i = dist(x_i - X_i)$$

where $err_i$ is the reprojection error of the reprojection of 3D point i, dist is the distance formula for the coordinate system being used, $x_i$ is the 2D coordinates of a keypoint in an image used to estimate 3D point i, and $X_i$ is the reprojection of the 3D point i back onto the image.

The loss function of the optimization performed in the bundle adjustment may be stated mathematically as:

$$\min \frac{1}{2} \sum_{i=1}^{n} \text{loss}(\|err_i\|^2)$$

where min is a minimization function, loss is a loss function, $err_i$ is the reprojection error of the reprojection of 3D point i, and n is the total number of 3D points. The loss function may take various forms. For example, in the case of non-linear least squares, the loss function may be loss (z)=z (i.e. identity) where z is the quantity being optimized. Likewise, in the case of Soft L1 the loss function may be loss(z)=2($\sqrt{1+z}-1$). A variety of other loss functions may alternatively be used. The loss function may be applied to the reprojection error in each of the set of images, and then a global optimization across all images determined.

Returning to FIG. 5, at step 560, the 3D reconstruction software process 494 (of the 3D model reconstruction software 490 on the electronic device 400 or of backend 3D model reconstruction processing software on a server or cloud services) utilizes the refined estimated 3D positions and camera parameters produced by the bundle adjustment operations in a dense 3D reconstruction to produce a 3D model that includes the object of interest.

Finally, at step 570, the 3D model reconstruction software 490 on the electronic device 400 may output the 3D model, for example, display the 3D model in a user interface on a display screen 460, save the 3D model to a storage device 475, etc.

As discussed above, existing photogrammetric 3D model reconstruction software typically has difficulty with ill-textured or very thin objects in the foreground (e.g., ill-textured or very thin infrastructure, such as a telecommunications tower, in the foreground). Much of this difficulty is due to the automatic SfM stage, and in particular how bundle adjustment operations are performed. With conventional bundle adjustment operations, errors and inaccuracy in the estimation of 3D points that are different distances from the camera don't have the same impact on reprojection error. A translation motion of the camera typically leads to a larger error for a 3D point that is near the camera (in the foreground) and a smaller error for a 3D point that is far from the camera (in the background).

Figure 7:
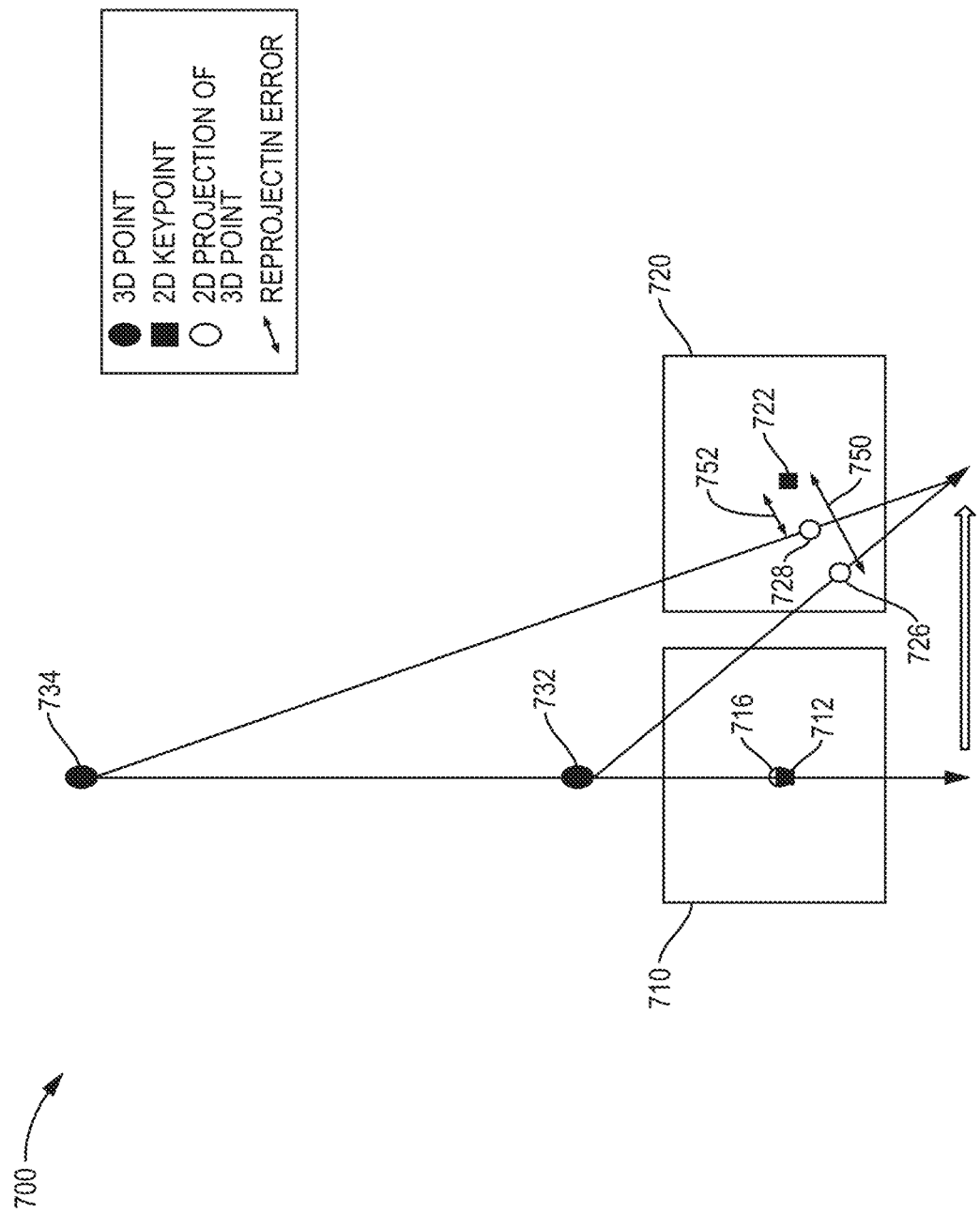
FIG. 7 is a diagram illustrating the effects of distance from a camera on reprojection error given an inaccurate camera translation.

FIG. 7 is a diagram illustrating the effects of distance from the camera on reprojection error given an inaccurate camera translation. Two images 710-720 are provided arranged in 3D space according to the pose from which they were captured. The images 610-630 include detected keypoints 712, 722 from which 3D points are estimated. If the keypoints 712, 722 are used to estimate a 3D point 732 that is close to the camera (in the foreground) the reprojection error 750 between the keypoint 722 and the projected point 726 due to inaccurate camera translation is likely to be greater than if the keypoints 712, 722 are used to estimate a 3D point 734 that is far from the camera (in the background), as shown by reprojection error 752 being smaller than reprojection error 750. This may be due to 3D points closer to the camera (in the foreground) having a larger baseline (i.e. the viewpoint angle changes more due to camera translation) than for 3D points far from the camera (in the background). As a consequence of a larger baseline, 3D point close to the cameras will have less 2D corresponding points because the matching often fails, leading to larger reprojection error. Having larger reprojection error, 3D points close to the camera (in the foreground) are more likely to be detected as outliers and discarded, or under-weighted, by outlier detection algorithms and robust loss functions. They may have little impact on the optimization performed by bundle adjustment operations and not prevent local optima from being reached as solutions, rather than global optima.

Figure 8:
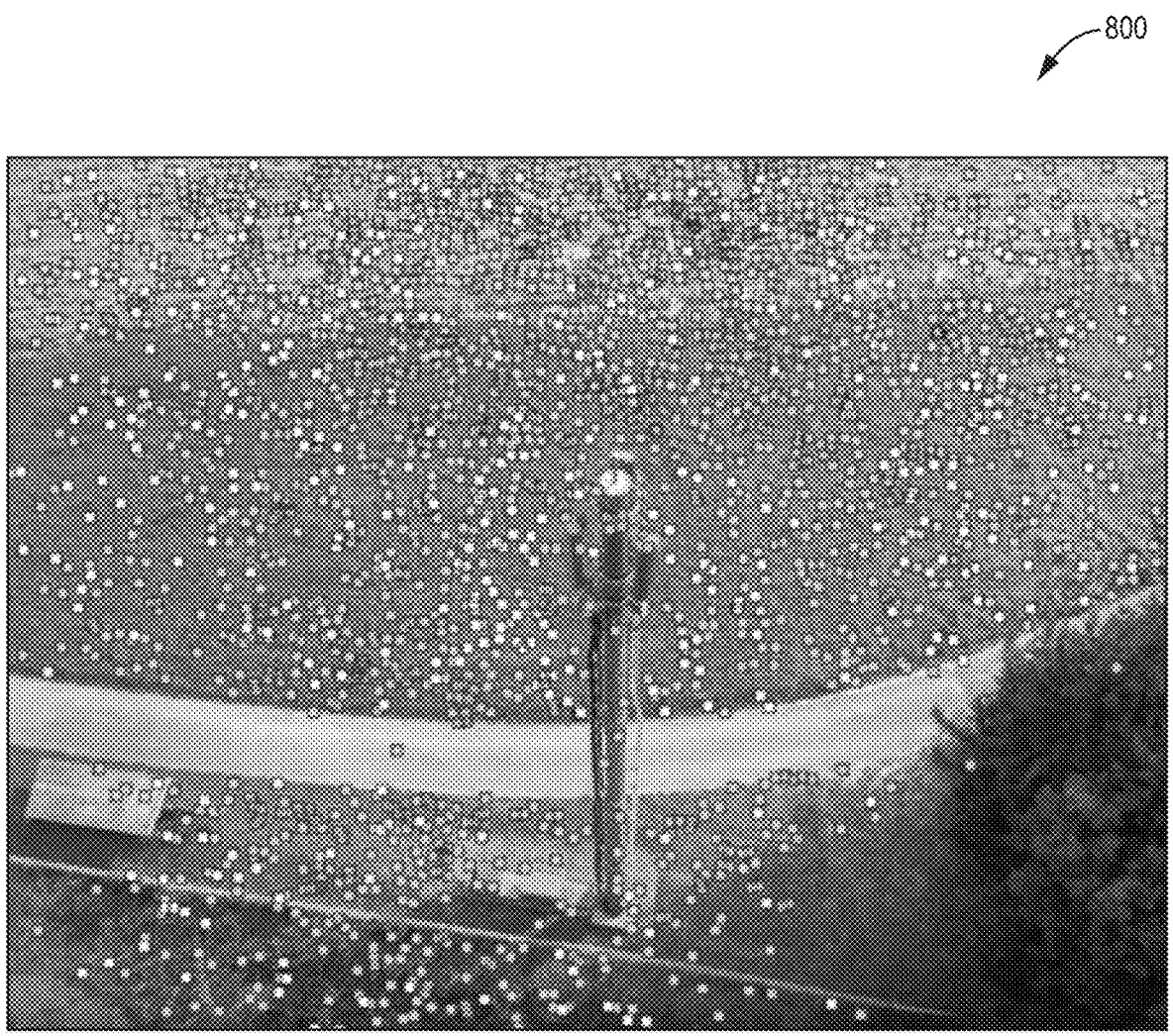
FIG. 8 is a diagram illustrating 3D points retained after outliers are discarded as part of bundle adjustment operations for a scene including a telecommunications tower.

FIG. 8 is a diagram 800 illustrating 3D points retained after outliers are discarded as part of bundle adjustment operations for a scene including a telecommunications tower. As can be seen, very few 3D points remain in the foreground on the telecommunications tower. The result of having few 3D points available is accuracy and completeness of the 3D model for the object of interest (e.g., the telecommunications tower in the foreground) may be poor, even though accuracy and completeness of the 3D model for other portions of the scene of little interest (e.g., the background) may be good.

To address these issues, step 550 of the sequence of steps 500 of FIG. 5, may be modified to apply a depth-aware weighting to the reprojection error of each 3D point used in the optimization. In a first embodiment, the reprojection error of each 3D point may be weighted based on a function of distance, for example, on an inverse of distance between the respective 3D point and the camera. In a second embodiment, 3D points may be clustered based on their distance to the camera in 3D space, and the reprojection error of each 3D point weighted based on a function of density of the cluster of the respective 3D point, for example, on an inverse of a number of points in the cluster of the respective 3D point. In a third embodiment, reprojection error of each 3D point may be weighted based on a function that combines distance and density (with an additional normalization). In each embodiment, the loss function may be scaled to account for the weighting. Such weighting may force consideration of 3D points on an object of interest in the foreground and improve convergence of the optimization to global optima.

Weighting of the reprojection error may be stated mathematically as:

$$err_i = w(i) * dist(x_i - X_i)$$

where $err_i$ is the reprojection error of the reprojection of 3D point i, w(i) is a depth-aware weighting function applied to 3D point i, dist is the distance formula for the coordinate system being used, $x_i$ is the 2D coordinates of a keypoint in an image used to estimate 3D point i, and $X_i$ is the reprojection of the 3D point i onto the image.

Scaling of the loss function of the optimization performed by bundle adjustment operations may be stated mathematically as:

$$\text{loss}(z, w) = w^2 \text{loss}(z/w^2)$$

where z is the quantity being optimized and w is the depth-aware weight.

In the first embodiment, where the reprojection error of each 3D point is weighted based on a function of distance, weight may be represented mathematically as:

$$w_{distance}(i)=1/d_i$$

where $w_{distance}$ is the distance weighting function and $d_i$ is a distance between 3D point i and the camera.

Figure 9:
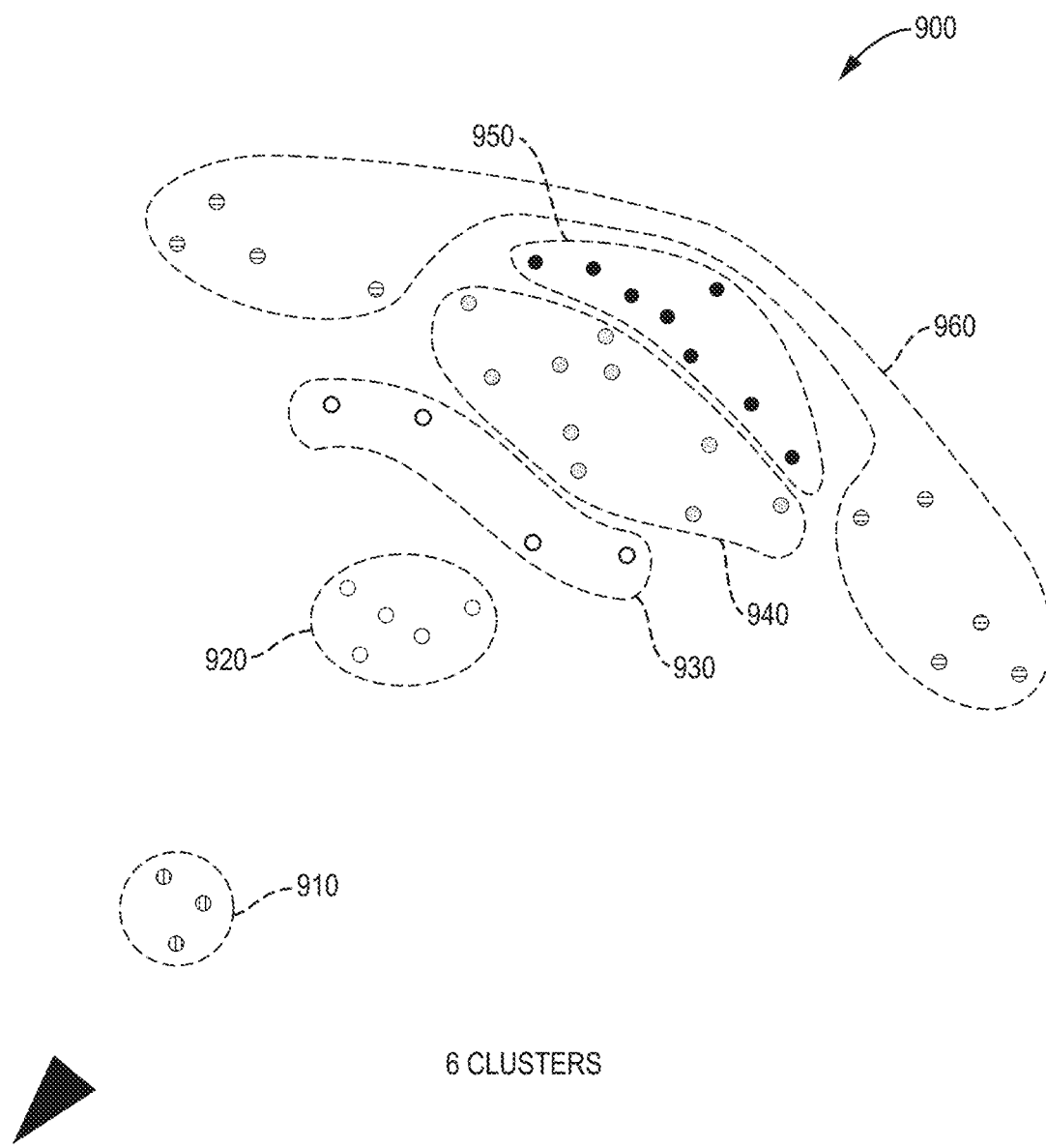
FIG. 9 is a diagram illustrating effects of clustering of 3D points based on their distance to a camera.

In the second embodiment, where the reprojection error of each 3D point is weighted based on a function of density, a clustering algorithm is first applied to partition the 3D points into a number of clusters based on their distance to the camera. In one implementation, the clustering algorithm may be a 1-dimensional (1D) k-mean clustering algorithm that partitions the 3D points into a number of clusters k, for example ten clusters (k=10). However, it should be understood other 1D clustering algorithms and other numbers of clusters may be utilized. FIG. 9 is a diagram 900 illustrating effects of clustering of 3D points based on their distance to the camera. In this example, 6 clusters 910-960 are formed.

Weighting in this second embodiment may be represented mathematically as:

$$w_{density}(i)=1/p_i$$

where $w_{density}$ is the density weighting function and $p_i$ is a number of points in the cluster of 3D point i.

In the third embodiment, where reprojection error of each 3D point is weighted based on a function that combines distance and density of clusters and an additional normalization is applied, scaling factors may be selected to balance the impact of both forms of information. Such balancing may ensure 3D points in the foreground have impact, while still allowing proper operation of a robust loss function and outlier detection algorithms. That is, it may still be possible to compare various errors and statistically classify the 3D points at a given distance from the camera.

Weighting based on a combination of distance and density of clusters and additional normalization may be represented mathematically as:

$$w_{combined}(i) = a\frac{w_{density}(i)}{S_{density}} + b\frac{w_{distance}(i)}{S_{distance}} + c$$

where $W_{combined}$ is the combined weighting function, $w_{density}$ is the density weighting function, $w_{distance}$ is the distance weighting function, $S_{density}$ is the sum of $w_{density}(i)$ for all 3D points i, $S_{distance}$ is the sum of $w_{distance}(i)$ for all 3D points i, and a, b and c are scaling factors selected to balance the forms of information with a+b+c=1.

It should be understood that a variety of further embodiments may also be used that apply depth-aware weighting to the reprojection error of each 3D point used in the optimization of bundle adjustment operations.

Figure 10:
FIG. 10 is a diagram illustrating 3D points retained after outliers are discarded as part of bundle adjustment operations that use depth-aware weighting of reprojection error, for the same scene as FIG. 8.

FIG. 10 is a diagram 1000 illustrating 3D points retained after outliers are discarded as part of bundle adjustment operations that use depth-aware weighting of reprojection error, for the same scene as FIG. 8. As can be seen, more 3D points remain in the foreground on the telecommunications tower than in FIG. 8.

Figure 1:
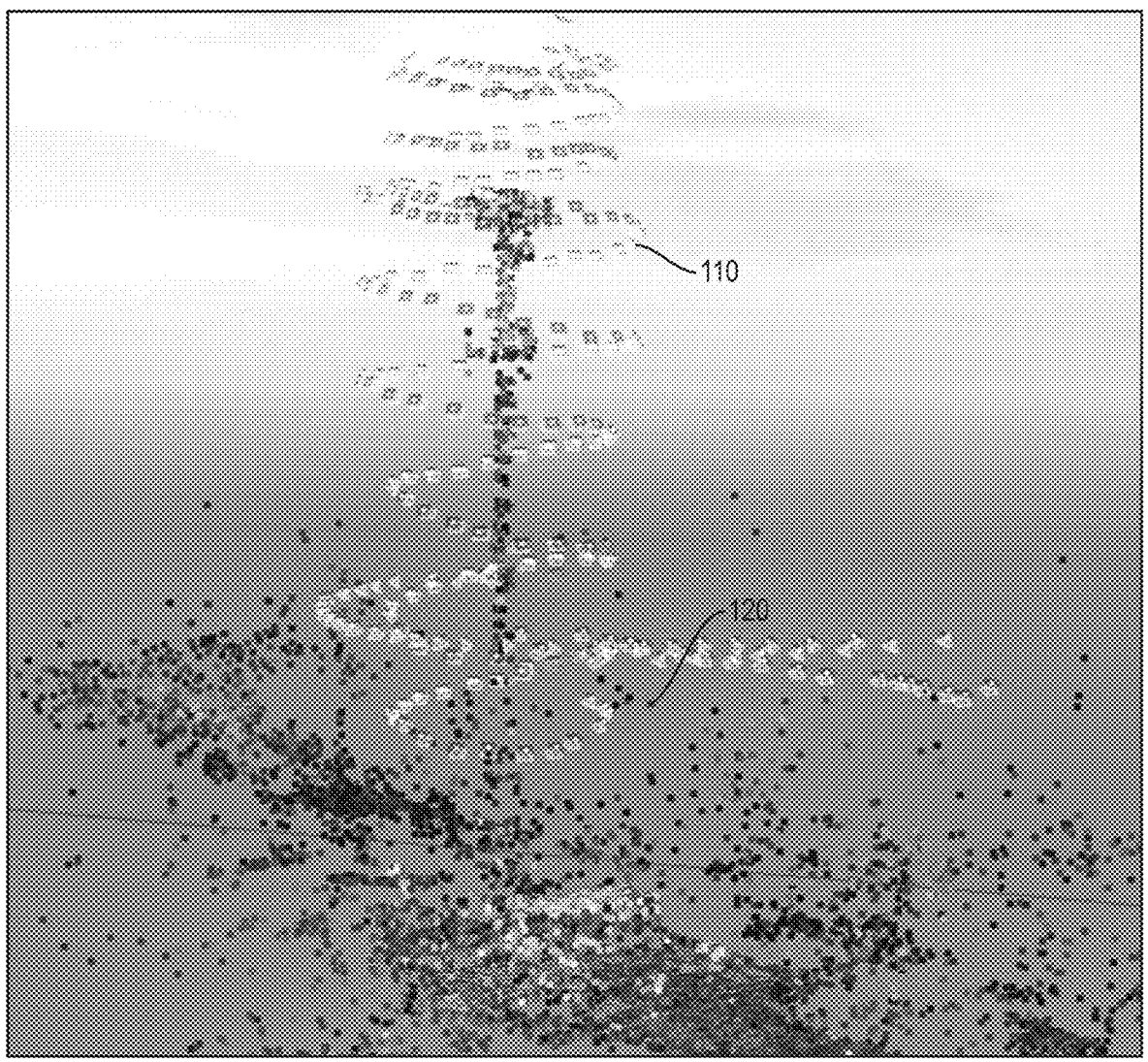
FIG. 1 is diagram illustrating example results of an automatic SfM stage for a scene including a telecommunications tower, with icons representing camera poses and 3D points of a sparse 3D point cloud.
Figure 2:
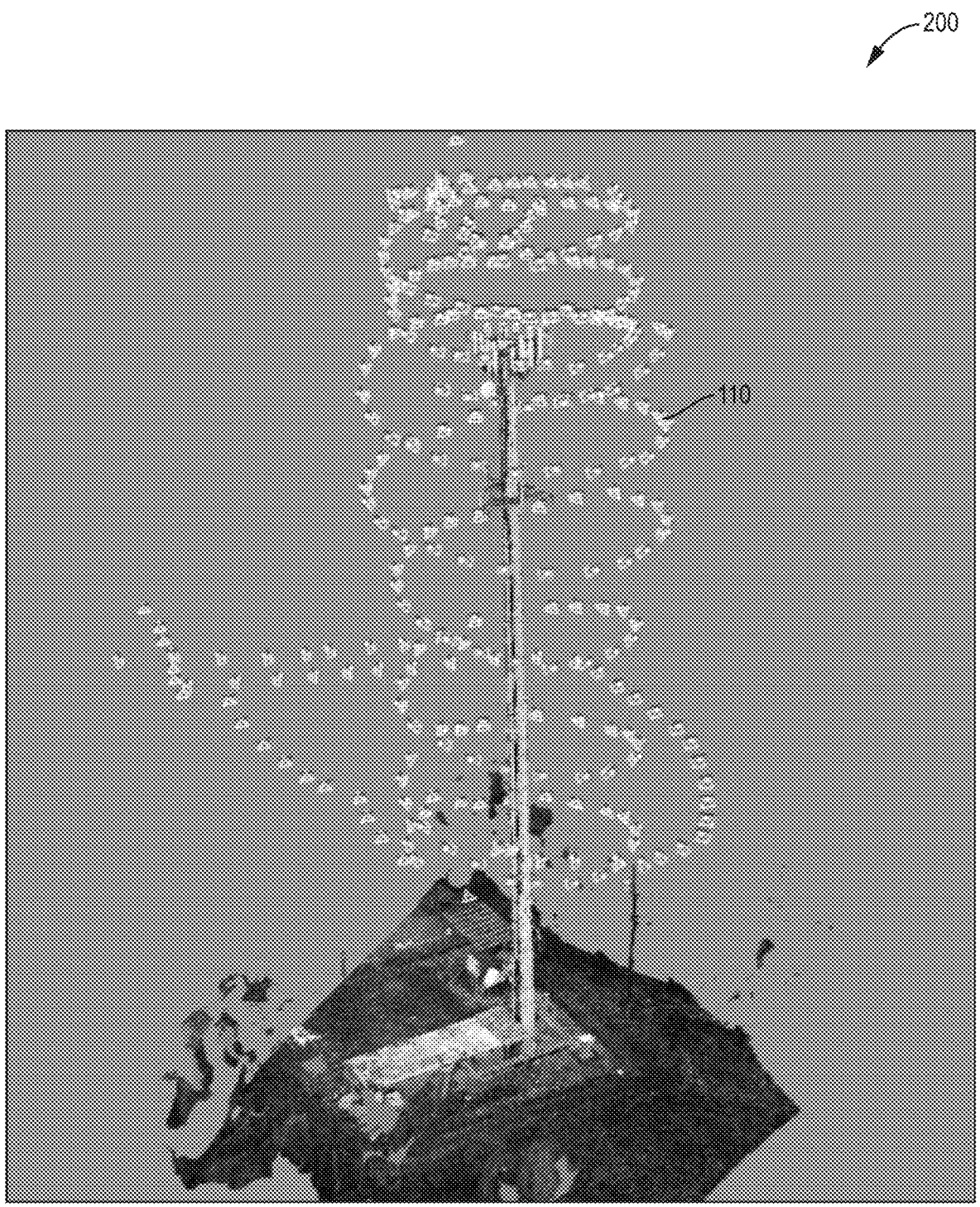
FIG. 2 is view including an example 3D model that may be produced by a 3D reconstruction stage for the scene of FIG. 1.
Figure 3:
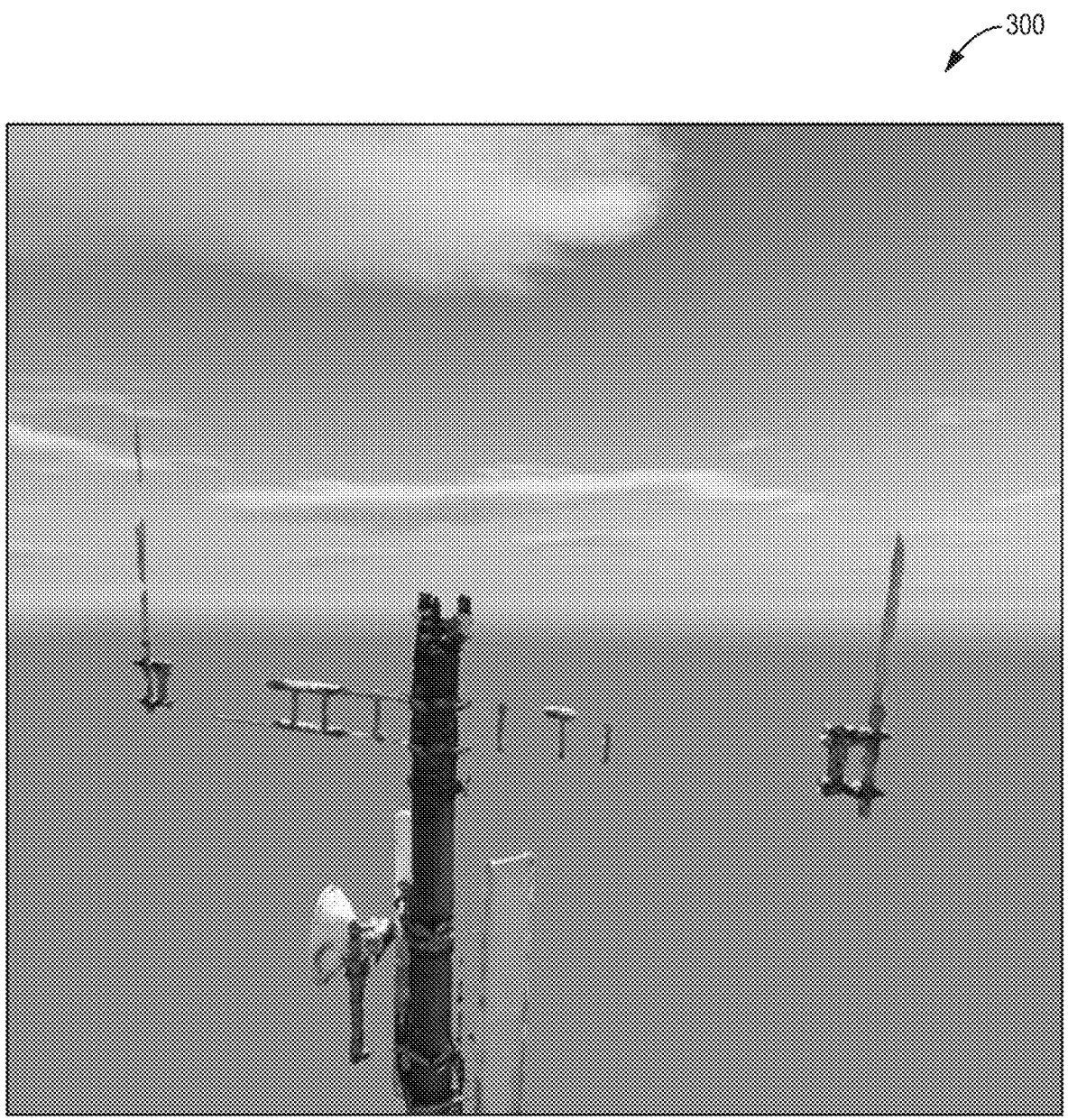
FIG. 3 is a view including an example inaccurate and incomplete 3D model of a telecommunications tower.
Figure 11:
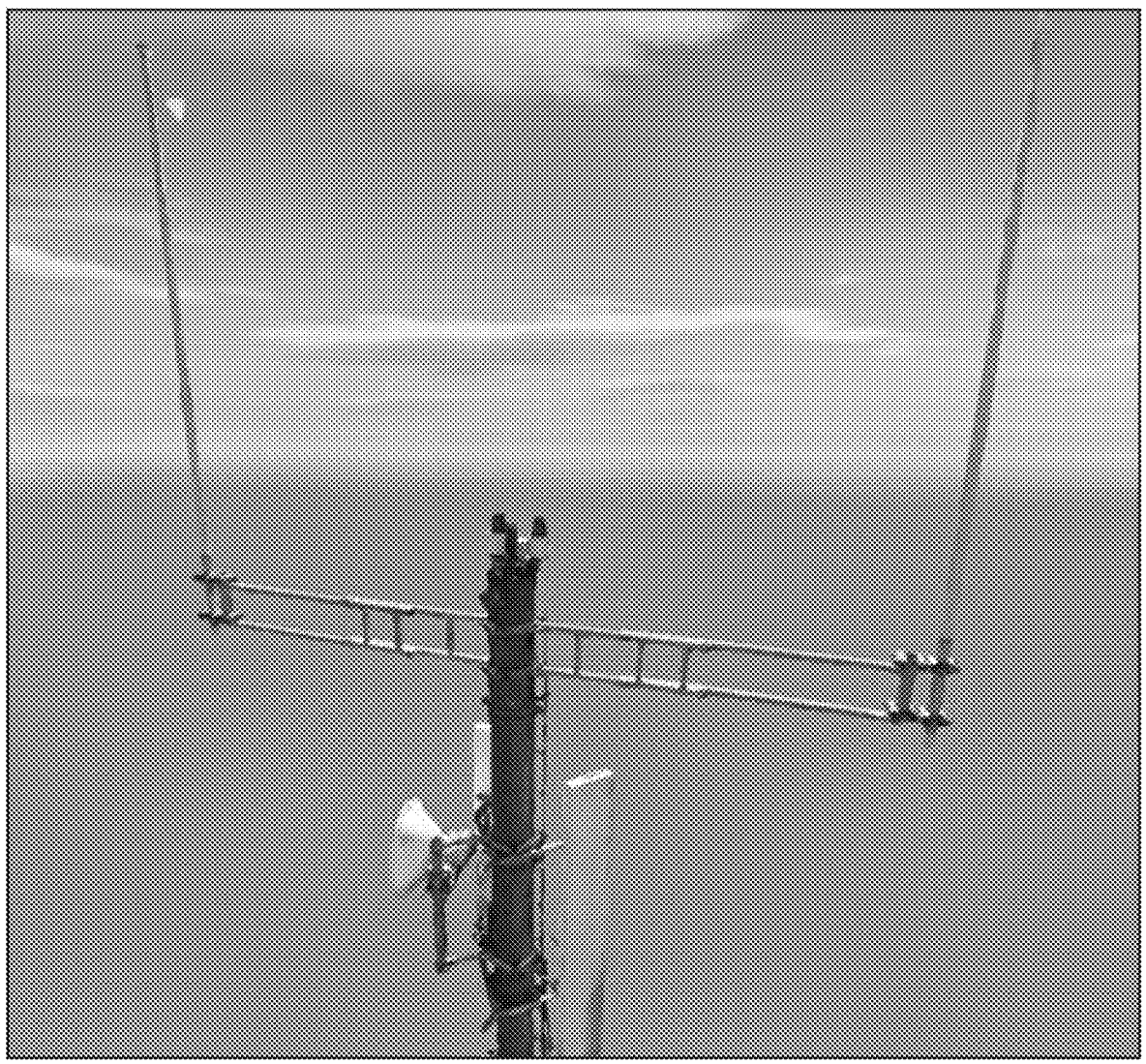
FIG. 11 is a view including an example 3D model produced using photogrammetric 3D model reconstruction that employs depth-aware weighting of reprojection error in bundle adjustment.

FIG. 11 is a view 1100 including an example 3D model produced using photogrammetric 3D model reconstruction that employs depth-aware weighting of reprojection error in bundle adjustment. As can be seen, portions of the struts and antennas of the telecommunications tower in the foreground that were not modeled in FIG. 3, are now modeled, resulting in a more accurate and complete 3D model.

It should be understood that such improvements may be achieved using depth-aware weighting of reprojection error in bundle adjustment operations without introducing other undesirable problems, such as increased hardware resource demands (i.e. processing time, storage requirements, etc.) and tedious workflows. This may enable the 3D model reconstruction software 490 and/or automatic SfM software process 492 to consume less processing and storage capabilities of electronic devices, in comparison to other attempted techniques, improving the functioning of the electronic devices. Likewise, it may enable photogrammetric 3D model reconstruction to be used in more situations, where it was previously impractical or impossible to do so, without burdening the user to manually address issues of accuracy and completeness.

It should be understood that a wide variety of modifications and adaptations may be made to the above described techniques. Further, many of the above described techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above described techniques are meant to be taken only by way of example.

What is claimed is:

1. A method for performing photogrammetric 3D model reconstruction, comprising
   obtaining, by 3D model reconstruction software executing on an electronic device, a set images of a scene that include an object of interest taken by a camera from different viewpoints;
   automatically selecting keypoints in the sets of images;
   automatically matching corresponding keypoints that appear in more than one of the set of images;
   estimating 3D points in 3D space for features of the scene represented by corresponding keypoints in the images;
   performing bundle adjustment operations to simultaneously refine the estimated 3D points and camera parameters for the set of images, the bundle adjustment operations performed as an optimization with a loss function that penalizes reprojection error, wherein a depth-aware weighting is applied to the reprojection error of each 3D point in the optimization;
   utilizing the refined estimated 3D positions and camera parameters produced by the bundle adjustment operations in a dense 3D reconstruction to produce a 3D model that includes the object; and
   displaying the 3D model, by the 3D model reconstruction software executing on the electronic device, on a display screen.

2. The method of claim 1, wherein the depth-aware weighting comprises a weighting based on a function of distance between the respective 3D point and the camera.

3. The method of claim 2, wherein the function of distance is an inverse of distance between the respective 3D point and the camera.

4. The method of claim 1, wherein performing the bundle adjustment operations comprise applying a clustering algorithm to partition the 3D points into a number of clusters based on their distance to the camera, and the depth-aware weighting comprises a weighting based on a function of density of the cluster of the respective 3D point.

5. The method of claim 4, wherein the function of density is an inverse of a number of points of the cluster of the respective 3D point.

6. The method of claim 4, wherein the clustering algorithm is a one-dimensional (1D) k-mean clustering algorithm.

7. The method of claim 1, wherein performing the bundle adjustment operations comprises applying a clustering algorithm to partition the 3D points into a number of clusters based on their distance to the camera, and the depth-aware weighting comprises a weighting based on a function that combines distance between the respective 3D point and the camera and density of the cluster of the respective 3D point.

8. The method of claim 1, wherein the object is an object in the foreground of the scene, and the depth-aware weighting is applied to the reprojection error to increase a number of 3D points retained by bundle adjustment operations on the object in the foreground.

9. The method of claim 1, wherein object is piece of infrastructure.

10. The method of claim 1, wherein the camera is part of an aerial drone, and the obtaining comprises:
receiving the set images from the aerial drone.

11. The method of claim 1, wherein the 3D model reconstruction software is a client application, and the automatically selecting keypoints, automatically matching corresponding keypoints, estimating 3D points, and performing the bundle adjustment operations are performed by backend 3D model reconstruction processing software executing on a server or cloud services architecture accessible to the electronic device over a network.

12. The method of claim 1, wherein the 3D model is a textured 3D mesh.

13. A system for performing photogrammetric three-dimensional (3D) model reconstruction, comprising:
a camera configured to capture a set images of a scene that include an object of interest taken from different viewpoints; and
one or more electronic devices configured to execute 3D model reconstruction software, the 3D model reconstruction software when executed operable to:
automatically select keypoints in the sets of images,
automatically match corresponding keypoints that appear in more than one of the set of images,
estimate 3D points in 3D space for features of the scene represented by corresponding keypoints in the images,
perform bundle adjustment operations to simultaneously refine the estimated 3D points and camera parameters for the set of images, the bundle adjustment operations performed as an optimization with a loss function that penalizes reprojection error, wherein a depth-aware weighting is applied to the reprojection error of each 3D point in the optimization, and
utilize the refined estimated 3D positions and camera parameters produced by the bundle adjustment operations in a dense 3D reconstruction to produce a 3D model that includes the object; and
a display device of the one or more electronic devices operable to display the 3D model.

14. The system of claim 13, wherein the depth-aware weighting comprises a weighting based on a function of distance between the respective 3D point and the camera.

15. The system of claim 13, wherein the 3D model reconstruction software when executed is further operable to apply a clustering algorithm to partition the 3D points into a number of clusters based on their distance to the camera, and the depth-aware weighting comprises a weighting based on a function of density of the cluster of the respective 3D point.

16. The system of claim 13, wherein the 3D model reconstruction software when executed is further operable to apply a clustering algorithm to partition the 3D points into a number of clusters based on their distance to the camera, and the depth-aware weighting comprises a weighting based on a function that combines distance between the respective 3D point and the camera and density of the cluster of the respective 3D point.

17. A non-transitory electronic device readable medium storing software for execution on one or more processors or one or more electronic devices, the software when executed operable to:
obtain a set images of a scene that include an object of interest taken by a camera from different viewpoints;
photogrammetrically reconstruct a three-dimensional (3D) model from the set of images utilizing an automatic structure-from-motion (SfM) stage and a dense 3D reconstruction stage, the automatic SfM stage including bundle adjustment operations that simultaneously refine estimated 3D points and camera parameters for the set of images by performing an optimization with a loss function that penalizes reprojection error, wherein a depth-aware weighting is applied to the reprojection error of each 3D point in the optimization, the dense 3D reconstruction stage to utilize the refined estimated 3D positions and camera parameters produced by the bundle adjustment operations to produce a 3D model that includes the object; and
is output the 3D model.

18. The non-transitory electronic device readable medium of claim 17, wherein the depth-aware weighting comprises a weighting based on a function of distance between the respective 3D point and the camera.

19. The non-transitory electronic device readable medium of claim 17, wherein the software when executed is further operable to apply a clustering algorithm to partition the 3D points into a number of clusters based on their distance to the camera, and the depth-aware weighting comprises a weighting based on a function of density of the cluster of the respective 3D point.

20. The non-transitory electronic device readable medium of claim 17, wherein the 3D model reconstruction software when executed is further operable to apply a clustering algorithm to partition the 3D points into a number of clusters based on their distance to the camera, and the depth-aware weighting comprises a weighting based on a function that combines distance between the respective 3D point and the camera and density of the cluster of the respective 3D point.

* * * * *

UNITED STATES PATENT AND TRADEMARK OFFICE
CERTIFICATE OF CORRECTION

| | | |
|---|---|---|
| PATENT NO. | : 10,957,062 B2 | Page 1 of 1 |
| APPLICATION NO. | : 16/239142 | |
| DATED | : March 23, 2021 | |
| INVENTOR(S) | : Nicolas Gros | |

It is certified that error appears in the above-identified patent and that said Letters Patent is hereby corrected as shown below:

In the Claims

Claim 17:
Column 12, Line 43 reads:
"is output the 3D model."
Should read:
-- output the 3D model. --

Signed and Sealed this
Eighth Day of July, 2025

Coke Morgan Stewart
*Acting Director of the United States Patent and Trademark Office*